United States Patent [19]

Schmitt

[11] Patent Number: 4,696,692

[45] Date of Patent: Sep. 29, 1987

[54] KINEMATICALLY DETERMINATE GLASS PRESSING MOLD ASSEMBLY AND METHOD OF USE

[75] Inventor: Paul S. Schmitt, Corning, N.Y.

[73] Assignee: Corning Glass Works, Corning, N.Y.

[21] Appl. No.: 940,120

[22] Filed: Dec. 10, 1986

[51] Int. Cl.$^4$ .............................................. C03B 23/26
[52] U.S. Cl. ...................................... 65/102; 65/106; 65/275; 65/323
[58] Field of Search ................... 65/102, 106, 275, 323

[56] References Cited

U.S. PATENT DOCUMENTS 3,390,974 7/1968 Parsons et al. ...................... 65/323
4,481,023 11/1984 Marechal et al. ................. 65/106 X
4,629,489 12/1986 Hirota et al. ......................... 65/102

FOREIGN PATENT DOCUMENTS 1021926 1/1986 Japan ..................... 65/323

Primary Examiner—Arthur Kellogg
Attorney, Agent, or Firm—B. R. Turner; R. E. Kurtz

[57] ABSTRACT

A multi-part mold assembly molds glass lenses. A cylindrical sleeve between the top and bottom molds has three cut-outs forming three alignment pads on both ends of the sleeve. These pads are preferably equally spaced around the circumference of the sleeve to constrain the top and bottom molds against rotation about X and Y axes which are orthogonal to the direction of closing of the mold. The alignment pads set the closed vertical positions of the molds. A torus on the bottom mold contacts a tapered opening in a removable sleeve insert to position a glass preform which is held by the insert. A torus on the top mold and a torus on the bottom mold bear against a cylindrical inner surface of the sleeve to precisely align the molds in the X and Y directions.

17 Claims, 6 Drawing Figures

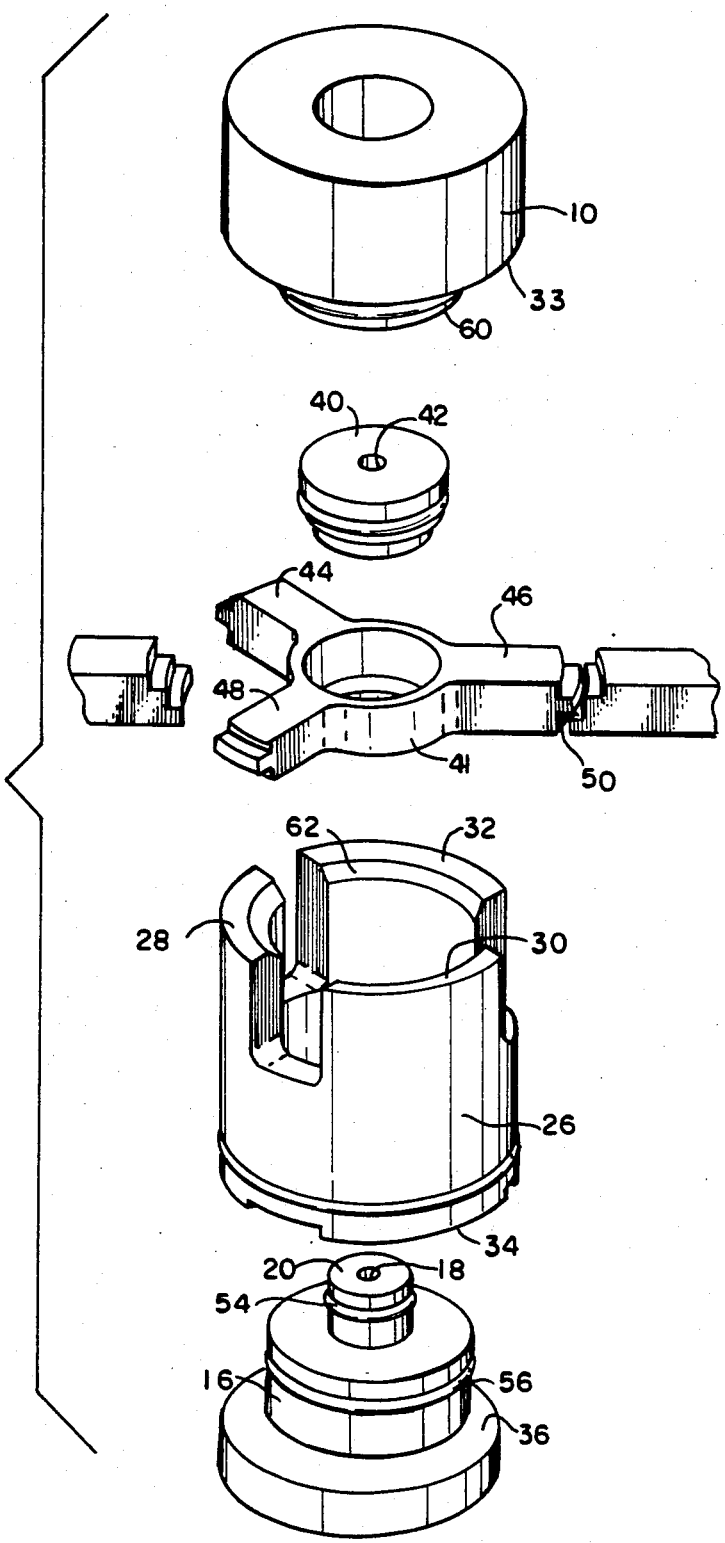

KINEMATICALLY DETERMINATE GLASS PRESSING MOLD ASSEMBLY AND METHOD OF USE

BACKGROUND OF THE INVENTION

Precision optical elements require highly polished surfaces of exacting figure and surface quality. The surfaces demand fabrication in proper geometric relation to each other and, where the elements are to used in transmission applications, they will be prepared from a material of controlled, uniform, and isotropic refractive index.

Precision optical elements of glass are customarily produced via one of two complex, multi-step processes. In the first, a glass batch is melted in a conventional manner and the melt formed into a glass body having a controlled and homogeneous refractive index. Thereafter, the body may be reformed utilizing well-known repressing techniques to yield a shape approximating the desired final article. The surface figure and finish of the body at this stage of production, however, are not adequate for image forming optics. The rough article is fine annealed to develop the proper refractive index and the surface figure improved via conventional grinding practices. In the second method the glass melt is formed into a bulk body which is immediately fine annealed and subsequently cut and ground to articles of a desired configuration.

Both processes are subject to similar limitations. The surface profiles that are produced through grinding are normally restricted to conic sections, such as flats, spheres, and parabolas. Other shapes and, in particular, general aspheric surfaces are difficult to grind. In both processes, the ground optical surfaces are polished employing conventional, but complicated, polishing techniques which strive to improve surface finish without comprising the surface figure. In the case of aspheric surfaces, this polishing demands highly skilled and expensive hand working. A final finishing operation, viz., edging, is commonly required. Edging insures that the optical and mechanical axes of a spherical lens coincide. Edging, however, does not improve the relationship of misaligned aspheric surfaces, which factor accounts in part for the difficulty experienced in grinding such lenses.

The direct molding of lenses to the finished state could, in principle, eliminate the grinding, polishing, and edging operations, which are especially difficult and time consuming for aspheric lenses. Indeed, molding processes are utilized for fabricating plastic lenses. Nevertheless, existing plastics suitable for optical applications are available in a limited refractive index and dispersion range only. Furthermore, many plastics scratch easily and are prone to the development of yellowing, haze, and birefringence. The use of abrasion-resistant and anti-reflective coatings has not fully solved those failings. Moreover, plastic optical elements are subject to distortion from mechanical forces, humidity, and heat. Both the volume and refractive index of plastics vary substantially with changes in temperature, thereby limiting the temperature interval over which they are useful.

The overall properties of glass render it generally superior to plastic as an optical material. Conventional hot pressing of glass, however, does not provide the exacting surface figures and surface qualities demanded for image forming optics. The presence of chill wrinkles in the surface and surface figure deviations constitute chronic afflictions. As observed above, similar problems can be encountered in conventional repressing techniques.

Various schemes have been devised to correct those problems, such devices frequently involving isothermal pressing, i.e., utilizing heated molds so that the temperature of the glass being molded will be essentially the same as that of the molds, the use of gaseous environments inert to the glass and mold materials during the pressing operation, and/or the use of materials of specifically defined compositions in the construction of the molds.

U.S. Pat. No. 4,481,023-Marechal and Maschmeyer shows and describes an improved mold for precisely pressing a glass preform which has an overall geometry closely similar to the desired final lens. A top and a bottom mold have molding cavities which precisely match the configuration of the final lens. A glass preform is heated to the molding temperature and the mold parts are separately heated. The molds are brought together against a ring having a thickness which governs the thickness of the lens to be molded.

In such molding operations, the volume of the glass that is put into the molding cavities is controlled by measuring its mass. The density of the glass is accurately known. However, it is desirable to make the mold and the molding process relatively insensitive to the mass of the glass being molded. That is, the same precision shape of the lens should be obtained regardless of minor variations in the mass of the glass put into the mold.

Another requirement for precision molding is that the position of the mold parts be "kinematically determinate" with respect to certain degrees of freedom. A rigid, free body has six degrees of freedom, namely displacements in each of the three orthogonal directions and rotations about each of those same three orthogonal directions. The rigid body's location in space is uniquely described when those three displacements and three rotational angles are defined or fixed. Those three displacements and three angles can be kinematically fixed by constraints. A mechanical contact is such a constraint which will in general fix one degree of freedom. As the contact area between two surfaces becomes small, the contact becomes more ideal in terms of repeatability. A mechanical design is kinematically determinate when the constraints in the system are equal in number to the degrees of freedom associated with the free body. When the degrees of freedom equal the constraints, then there is a single unique position for the free body when it comes into contact with those constraints. See Wilson, Jr. *An Introduction To Scientific Research*, pp. 104–108, McGraw Hill.

Objects which are rotationally symmetric about one of the axes will have only five degrees of freedom because one cannot distinguish any uniqueness to the object's position about the symmetric axis. Lenses are symmetrical about the optical axis. This removes one degree of freedom, but molds require fixing five degrees of mechanical freedom in order to precisely and repeatedly place them in the correct location to mold a highly accurate lens.

It is an object of the present invention to provide an improved glass mold and molding operation which precisely sets the final mold positions to precisely form the desired lens configuration.

SUMMARY OF THE INVENTION

In accordance with the present invention, a kinematically determinate mold assembly has alignment pads that halt mold movement when the lens is fully formed. The mold parts are precisely controlled in the five degrees of freedom which must be precisely constrained to mold the desired lens configuration.

Since the lens to be formed has rotational symmetry, there are five degrees of freedom associated with a kinematically determinate, highly precise mechanism for positioning each of the molds which form the lens. The subject mechanism utilizes five constraints to precisely locate each mold. This meets the conditions of kinematically determinate mechanisms. Furthermore, the uniqueness associated with a kinematically determinate design will ensure repeatedly precise closing of the molding system for each cycle of fabrication of a molded part.

In accordance with the invention, a cylindrical sleeve between the top and bottom molds has cut-outs which form three flat alignment pads on both ends of the sleeve. The pads are equally spaced around the circumference of the sleeve. Upon closing, the molds abut the alignment pads to set the final lens thickness. In accordance with the invention, the three alignment pads constrain the mold against rotation about axes which are orthogonal to the direction of closing of the molds.

Further in accordance with the invention, a torus on each of the molds contacts a cylindrical surface in the mold assembly to precisely set the position of the molds in the directions orthogonal to the direction of closing of the molds.

Further in accordance with the invention, a removable sleeve insert holds the glass to be molded. This sleeve insert is precisely centered with respect to the molds by a cylindrical surface which contacts a torus on one of the molds. The cylindrical surface has a tapered opening which is wider where the torus enters the surface. As the mold closes, the taper of the surface moves the sleeve insert to precisely center it with respect to both molds.

By using the molds and method of the present invention, glass lenses can be obtained having precision surfaces and thicknesses with a relatively wide range of glass mass.

The foregoing objects, features and advantages of the invention will be better understood from the following more detailed description and appended claims.

SHORT DESCRIPTION OF THE DRAWINGS

FIG. 2 is a partial exploded perspective view of the mold assembly;

DESCRIPTION OF THE PREFERRED EMBODIMENT

Figure 1:
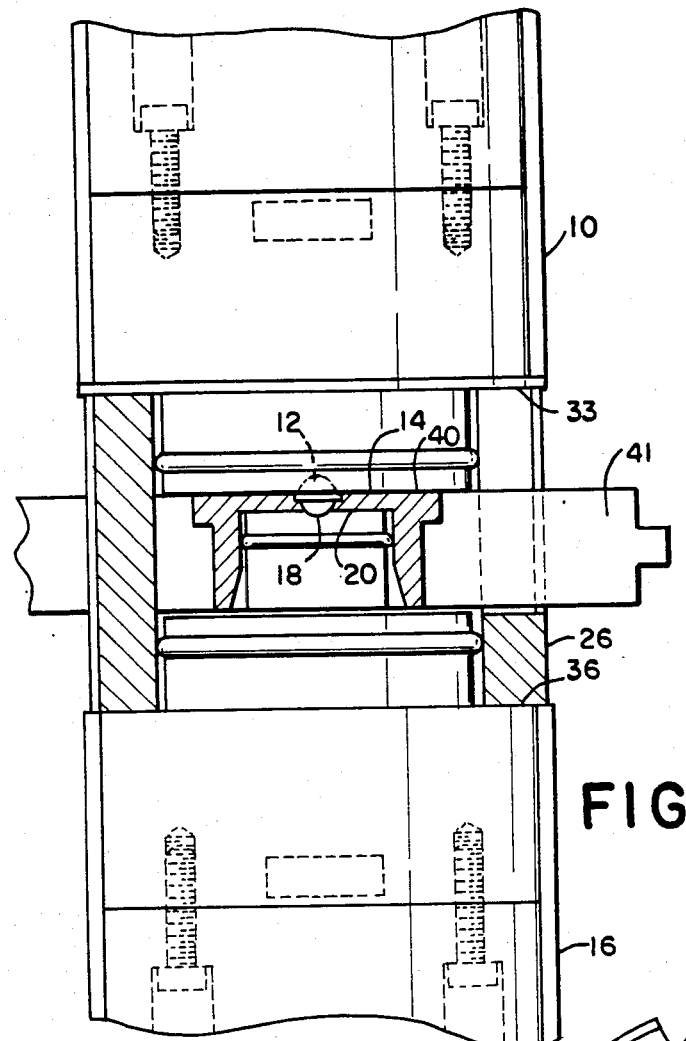
FIG. 1 depicts the mold assembly of the present invention schematically.

FIG. 1 shows a multi-part mold assembly for molding glass lenses. A top mold 10 has a mold recess or molding surface 12 formed in the face of the mold. A bottom mold 16 similarly has a recess or molding surface 18 formed in the face 20 which is opposed to the face 14 in the top mold 10. Power driven pistons 22 and 24 (FIGS. 3 and 4) provide means for closing the top and bottom molds to form a mold cavity, including the recesses formed in the opposed faces, which shapes the glass preform in the cavity.

Figure 1A:
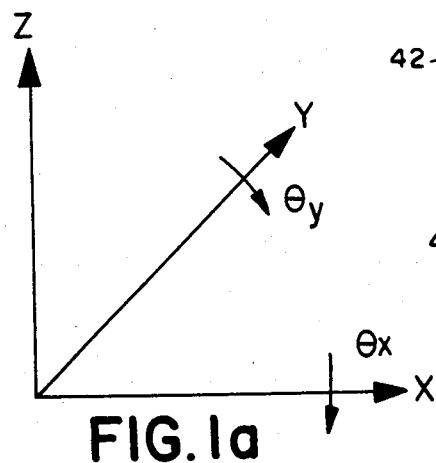
FIG. 1a depicts the degrees of freedom of the mold parts.

In accordance with the invention, a cylindrical sleeve 26 is between the top and bottom molds. As shown in FIG. 2, it has cut-outs which form three alignment pads 28, 30 and 32 on the top end of the sleeve. Although the alignment pads 28, 30 and 32 are preferably equally spaced around the circumference of the sleeve, it is important that the locus of points connecting the three pads encloses the axis along which the molds 10 and 16 move toward and away from each other. A face 33 of the top mold 10 abuts the alignment pads when the molds are closed. The alignment pads set the vertical closing position of the top mold 10. Importantly, the use of three alignment pads constrains the top mold 10 against rotation about axes which are orthogonal to the direction of closing of the molds. FIG. 1a depicts the five degrees of freedom in which the molds must be constrained to obtain precision molding. The Z axis is the direction of closing of the mold parts. The X and Y axes are directions orthogonal to the direction of closing of the mold parts. The molds must be precisely positioned in the X and Y direction and they must be constrained with respect to rotation about these axes. Rotation about the Y axis is denoted $\theta_Y$ and rotation about the X axis is denoted $\theta_X$. The fifth degree of freedom is position along the Z axis. The molds need not be constrained against rotation about the Z axis, because the lenses and mold cavities are symmetrical.

Referring again to FIG. 2, the three alignment pads 28, 30 and 32 constrain the top mold 10 against rotation in the $\theta_X$ and $\theta_Y$ directions. The use of three alignment pads is important because other configurations of the abutting surfaces would not provide the kinematically determinate surfaces provided by three pads. With the cut-out the mold face 33 would be more susceptible to canting with respect to the cylindrical sleeve 26.

The bottom end of cylindrical sleeve 26 has similar cut-outs which form three flat alignment pads on the bottom end of the sleeve. Only pad 34 is visible in FIG. 2. The face 36 of bottom mold 16 abuts the three alignment pads, including pad 34, to set the closing height of the bottom mold and to constrain the bottom mold against rotation in the $\theta_X$ and $\theta_Y$ directions.

Figure 5:
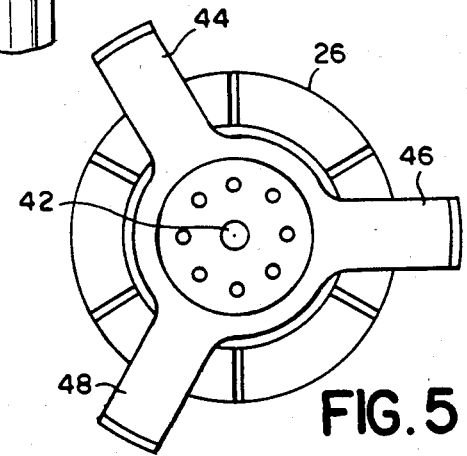
FIG. 5 is a section on the lines 5—5 of FIG. 4.
Figure 3:
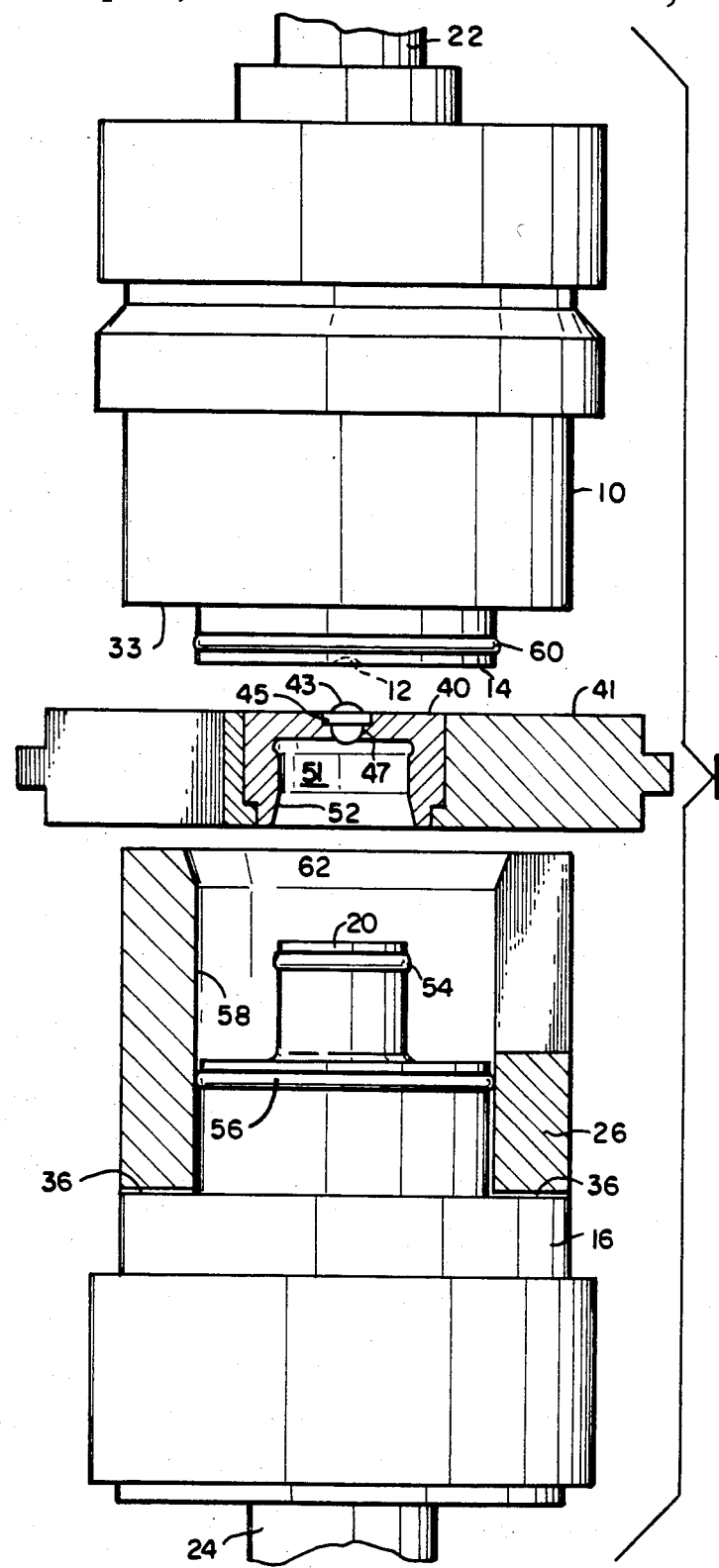
FIG. 3 shows the mold assembly with the molds in the open position.

A sleeve insert 40 has a cavity 42 which holds a glass preform which is heat-softened and then molded by the opposed molding surfaces of the top and bottom molds 10 and 16. As best shown in FIGS. 2 and 5, the sleeve insert 40 is carried in an insert carrier 41, which has the form of a spider, having arms 44, 46 and 48, which support the center of spider 41 between the upper and lower molds. When positioned in the mold assembly, the arms 44, 46 and 48 of spider 41 rest on a ledge 50 in the mold assembly. The spider 41 and sleeve insert 40 are removable as an assembly from the mold assembly to permit the pre-heating of them and a glass preform to a desired molding temperature. A glass preform 43 is placed in the cavity 42 of sleeve insert 40 (FIG. 3).

Figure 4:
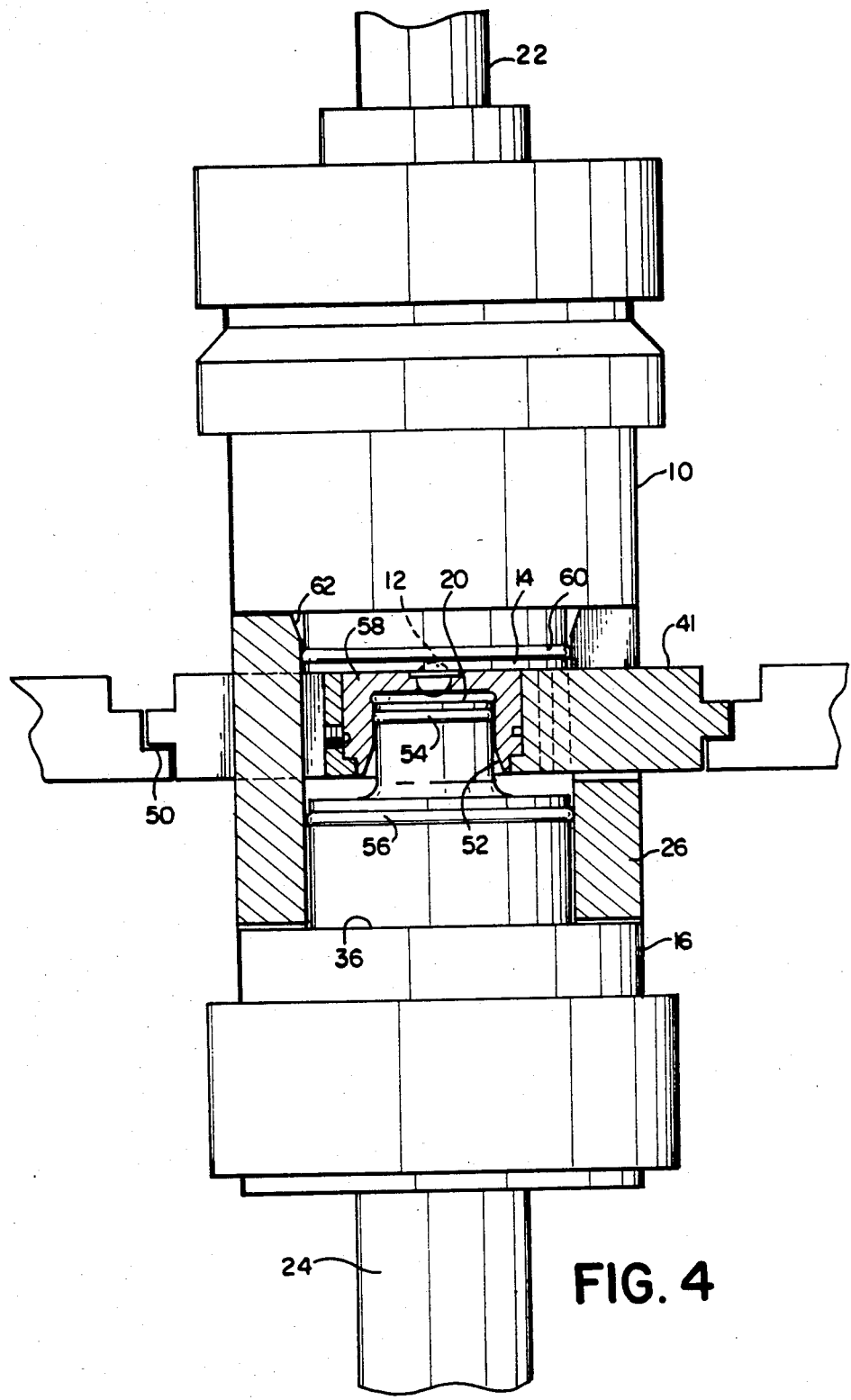
FIG. 4 is similar to FIG. 3, but shows the molds fully closed.

Cavity 42 in sleeve insert 40 has a cylindrical wall 45 which forms the edge of the lens. Toward the bottom of the cylindrical surface 45 is a step 47 that keeps the glass preform from falling through the center cavity of sleeve insert 40. The bottom of the cavity 42 is open at 51 to allow the bottom mold to enter the insert to mold the bottom surface on the glass lens as shown in FIG. 4.

The sleeve insert 40 has a cylindrical opening 51 which has a taper 52 (FIG. 3) at the bottom opening. A torus 54 on the bottom mold 16 enters the tapered opening in the sleeve insert when the molds are closed. (See FIGS. 3 and 4.) As the torus 54 moves into the constrained portion of the cylindrical opening 51, it moves the sleeve insert in the X and Y directions to precisely center the sleeve insert with respect to the molds.

In order to constrain the bottom mold in the X and Y directions as the molds are closed, a torus 56 is constrained by a cylindrical inner surface 58 of the sleeve 26. This cylindrical inner surface 58 precisely aligns the bottom mold in the X and the Y directions.

Alignment of the top mold in the X and Y directions is achieved by a torus 60 on the top mold. Torus 60 enters a tapered opening 62 in the sleeve 26. (FIG. 4) As the torus 60 moves within the constraining cylindrical inner surface of the sleeve 26, the top mold 10 is precisely centered with respect to the glass 43 in the cavity 42 in the sleeve insert 40.

In this manner, the recesses 12 and 18 in the faces 14 and 20 of the top and bottom molds are constrained and properly aligned in five degrees of freedom. This provides the precise lens molding which is desired.

High precision, consistent alignment of forming cavities is obtained using the described invention. The invention incorporates the principles of kinematically determinate alignment to provide angular alignment of the opposed cavities to within 0.05 milliradius and to provide lateral axial alignments of the opposed cavities to within 0.010 millimeters. The fixture allows control of the formed objects thickness to within 0.030 millimeters. The fixture maintains these alignments at temperatures above the ambient conditions to 375° C.

While a particular embodiment of the invention has been shown and described, various modifications are within the true spirit and scope of the invention. The appended claims are, therefore, intended to cover all such modifications.

I claim:

1. A multi-part mold assembly for molding glass lenses comprising:
    a first mold, a first molding surface formed in a face of said first mold;
    a second mold, a second molding surface formed in a face of said second mold, the faces of said molds being opposed;
    means for closing said first and second molds along a first axis to form a mold cavity including said first and second molding surfaces;
    sleeve means positioned between said first and second molds for kinematically determining the alignment of said first and second molding surfaces;
    one of said sleeve means and said first mold having a first set of three alignment pads formed thereon, the other of said sleeve means and said first mold set having first surface means for abutting said alignment pads and for constraining said first mold against rotation about axes which are orthogonal to the direction of closing said molds; and
    one of said sleeve means and said second mold having a second set of three alignment pads formed thereon, the other of said sleeve means and said second mold having second surface means for abutting said second set of alignment pads and for constraining said second mold against rotation about axes which are orthogonal to the direction of closing said molds.

2. The mold assembly recited in claim 1 wherein said sleeve means is cylindrical and has three cut-outs in at least one end thereof forming one set of said pads, and the locus of points connecting the three pads encloses said first axis.

3. The mold assembly recited in claim 1 wherein said sleeve means has cut-outs forming three flat alignment pads on both ends thereof, said first mold contacting the alignment pads on one end of said sleeve means, and said second mold contacting the alignment pads on the other end of said sleeve means.

4. The mold assembly recited in claim 1 further comprising:
    a sleeve insert having cavity means for holding a glass prefrom and for cooperating with the opposed molding surfaces of said molds in molding said glass in a heat-softened condition.

5. The mold assembly recited in claim 4 wherein said insert is carried by a spider having arms supporting the center of said spider between said first and second molds, the cavity in said insert being at the center of said spider.

6. The mold assembly recited in claim 4 wherein said insert is removable from said mold assembly for heating said glass preform.

7. The mold assembly recited in claim 4 wherein said insert is movable in directions orthogonal to the direction of closing motion of said mold members to center it between said first and second molds.

8. The mold assembly recited in claim 7 wherein said insert has a tapered inner cylindrical surface; and
    torus means, formed on one of said molds, for contacting said cylindrical inner surface of said insert and for aligning said insert with respect to said mold as it closes.

9. The mold assembly recited in claim 1 wherein said molds are symmetrical about an axis extending in the direction of closing.

10. The mold assembly recited in claim 1 wherein one of said molds includes torus means formed thereon and wherein said sleeve means has a cylindrical inner surface in which said torus means fits to constrain said mold in directions orthogonal to the direction of closing.

11. The mold assembly recited in claim 10 wherein the other of said molds has a second torus means and wherein said sleeve means has a tapered opening for a cylindrical inner surface of said sleeve means, said second torus means on said other mold adapted to enter the tapered opening of said cylindrical inner surface, and said cylindrical inner surface aligning said other mold as it moves into said cylindrical surface.

12. A multi-part mold assembly for pressing precision optical elements from heat-softened glass preforms which comprises:
    a first mold having a first forming surface;
    a second mold having a second forming surface;
    means for moving said first and second molds toward and away from each other along a first axis for closing the mold assembly and pressing a preform within a cavity including said first and second forming surfaces, and for opening said mold cavity to remove a precision molded glass optical element;
    alignment means formed on each of said molds; and sleeve means positioned between said first and second molds and including spaced-apart alignment portions for cooperable engagement with said alignment means of said first and second molds for kinematically aligning said first and second forming purposes solely with respect to five degrees of freedom including displacements with respect to said first axis and second and third axes orthogonal to each other and to said first axis, and rotational angles about said second and third axes.

13. A multi-part mold assembly as defined in claim 12 wherein said alignment means formed on each of said molds includes torus means cooperable with an inner surface portion of said sleeve means for aligning said first and second forming surfaces with respect to said second and third axes as said first and second molds are moved toward one another along said first axis.

14. A multi-part mold assembly as defined in claim 12 wherein said alignment means formed on each of said molds includes surface portions cooperably engageable with said spaced-apart alignment portions formed on said sleeve means for aligning said first and second forming surfaces angularly about said second and third axes.

15. A method of precision molding optical elements from heat-softened glass preforms which comprises:
providing a first mold having a first molding surface;
providing a second mold having a second molding surface;
providing a sleeve member between said first and second molds for cooperating therewith to kinematically align said first and second molding surfaces;
providing a sleeve insert for retaining a glass preform to be molded into a precision optical element;
heat-softening said preform; and
moving said first and second molds along a first axis toward one another to form a mold cavity including said first molding surface, said second molding surface and a cavity in said sleeve insert for precision molding an optical element from the heat-softened preform retained by said insert, while simultaneously kinematically aligning said first and second molding surfaces solely with respect to five degrees of freedom including displacements with respect to said first axis and second and third axes orthogonal to each other and said first axis and with respect to angular rotation about said second and third axes.

16. A method of precision molding optical elements as defined in claim 15 including the step of simultaneously aligning said sleeve insert with the alignment of said first and second molding surfaces.

17. A method of precision molding optical elements as defined in claim 15 including the step of supporting said preform within a cavity formed in said sleeve insert such that said first and second molding surfaces operatively engage opposite ends of said preform when said first and second molds are moved toward one another.

* * * * *